(12) United States Patent
Fujio

(10) Patent No.: US 9,670,000 B2
(45) Date of Patent: Jun. 6, 2017

(54) CONVEYOR DEVICE AND METHOD OF ADJUSTING THE CONVEYOR DEVICE

(71) Applicant: Daifuku Co., Ltd., Osaka-shi, Osaka (JP)

(72) Inventor: Yoshihiko Fujio, Shiga (JP)

(73) Assignee: Daifuku Co., Ltd., Osaka (JP)

(*) Notice: Subject to any disclaimer, the term of this patent is extended or adjusted under 35 U.S.C. 154(b) by 0 days.

(21) Appl. No.: 15/269,107

(22) Filed: Sep. 19, 2016

(65) Prior Publication Data

US 2017/0088359 A1    Mar. 30, 2017

(30) Foreign Application Priority Data

Sep. 30, 2015 (JP) ................. 2015-192371

(51) Int. Cl.
 *B65G 23/44* (2006.01)
 *B65G 15/12* (2006.01)
 *B65G 39/16* (2006.01)

(52) U.S. Cl.
 CPC ............. *B65G 23/44* (2013.01); *B65G 15/12* (2013.01); *B65G 39/16* (2013.01)

(58) Field of Classification Search
 CPC ...... B65G 15/12; B65G 23/44; B65G 39/071; B65G 39/09; B65G 39/16
 USPC ............... 198/806, 810.03, 810.04, 813, 816
 See application file for complete search history.

(56) References Cited

U.S. PATENT DOCUMENTS

| | | | | |
|---|---|---|---|---|
| 3,467,450 A | * | 9/1969 | Schmidt | F16C 23/10 384/255 |
| 4,693,363 A | | 9/1987 | Kuehnert | 198/807 |
| 5,427,581 A | * | 6/1995 | McGrath | F16H 7/1254 474/101 |
| 5,676,613 A | * | 10/1997 | Valcourt | B65G 39/16 474/102 |
| 7,232,029 B1 | * | 6/2007 | Benedict | B65G 15/00 198/814 |
| 7,563,187 B2 | * | 7/2009 | Miyata | F16H 7/20 474/118 |
| 7,909,159 B1 | * | 3/2011 | Zats | B65G 15/12 198/586 |
| 2006/0027444 A1 | | 2/2006 | Donnenhoffer | 198/806 |

FOREIGN PATENT DOCUMENTS

| | | | | |
|---|---|---|---|---|
| EP | 0 180 106 A2 | 10/1985 | ............ | B65G 15/64 |
| EP | 2 862 819 A1 | 4/2015 | ............ | B65G 21/10 |
| JP | 2004-210447 | 7/2004 | ............ | B65G 23/44 |
| WO | WO 2012/045622 A1 | 4/2012 | ............ | G03G 15/00 |

OTHER PUBLICATIONS

Extended European Search Report issued in corresponding European Patent Application No. 16191077.3 dated Mar. 2, 2017.

* cited by examiner

*Primary Examiner* — Gerald McClain
*Assistant Examiner* — Keith R Campbell
(74) *Attorney, Agent, or Firm* — Kusner & Jaffe

(57) ABSTRACT

A non-driving pulley included in the conveyor device has an adjustment collar between a bearing and a shaft of the non-driving pulley. The adjustment collar has an adjustment outer surface inclined relative to a reference axis $X_B$ of the shaft. The adjustment collar rotated relative to the shaft changes the state of inclination of the adjustment outer surface supporting the bearing, thereby changing the orientation of the non-driving pulley having the wrapped belt.

6 Claims, 7 Drawing Sheets

CONVEYOR DEVICE AND METHOD OF ADJUSTING THE CONVEYOR DEVICE

FIELD OF THE INVENTION

The present invention relates to a conveyor device of the type that revolves a wrapping member between a plurality of rotating members, and a method of adjusting the conveyor device.

BACKGROUND OF THE INVENTION

As a conveyor device for transporting articles, a device of the type (so-called belt conveyor) is available that transports articles on a belt revolving between a plurality of pulleys, the belt being wrapped around the pulleys.

Such a conveyor device may vary the accuracy of a positional relationship between the pulleys (e.g., parallelism accuracy) or the accuracy of form between the own pulleys (e.g., diameter accuracy) or cause an external force to an article to be conveyed on the belt. In this case, the position of the belt on the outer surface of the pulley may laterally deviate from the center of the outer surface (cylinder side) of the pulley with respect to the transporting direction, that is, mistracking may occur.

In an ordinary belt conveyor, the surface of a pulley is worked (crowned) so as to protrude the central part of the outer surface of the pulley. The belt revolving between pulleys comes close to the protrusion (crown effect), so that mistracking is unlikely to occur. Moreover, the accuracy of the positional relationship and the accuracy of form has been increased to prevent mistracking as much as possible.

However, it is difficult to form/place various components with completely ideal accuracy. Even if high accuracy is obtained, the used pulleys and belt may be slightly deformed by friction or a temperature change, leading to difficulty in completely preventing mistracking for an extended period.

Thus, a conveyor device may have a mistracking regulating function that corrects a belt position in the event of mistracking so as to eliminate the mistracking.

For example, FIG. 7 shows a conveyor device 90 that is a double conveyor provided with two right and left belts 92 for transporting an article 93. The belts 92 travel in a transporting direction with the article 93 hung between the right and left belts 92, thereby transporting the article 93 in the transporting direction. In the conveyor device 90, a frame 91 supports both ends of a shaft 96 that pivotally supports a pulley 94 having the wrapped belt 92. Both ends of the shaft 96 can be longitudinally moved along the transporting direction of the article 93 by the rotation of a handle 98.

Moving both ends of the shaft 96 by the same amount changes a distance between the illustrated pulley 94 and a pulley (not shown) opposite to the pulley 94 in the transporting direction, regulating the tension of the belt 92 looped between the pulleys. Moving only one end of the shaft 96 inclines the orientation of the pulley 94. This changes the position of the traveling belt 92 on the pulley 94 so as to regulate mistracking.

Japanese Patent Laid-Open No. 2004-210447 describes a method in which a tension pulley with a weight is disposed under a conveyor device and a belt is wrapped around the tension pulley. In this method, a tension is applied to the belt by the load of the weight and the load is evenly distributed to both sides of the tension pulley. This suppresses unevenness in the vertical movement of the tension pulley, thereby preventing mistracking of the belt.

In the conventional method of FIG. 7, however, even if an operator moves only one end of the shaft 96 to regulate mistracking, the position of the pulley 94 slightly changes in the transporting direction and thus the tension of the belt 92 also changes. In the regulation of tension, the operator moves both ends of the shaft 96 by completely the same amount, thereby changing only the tension without changing the orientation of the pulley 94. However, even a small difference in the amount of movement between one end and the other end may change the orientation of the pulley 94, causing mistracking. Since it is difficult to move both ends of the shaft 96 by completely the same amount, mistracking regulation is always necessary after the tension regulation. In this way, the mistracking regulation and the tension regulation affect each other. It is difficult for the operator to separately regulate only one of mistracking and tension. Thus, the operator needs to carefully move both ends of the shaft 96 in consideration of a mistracking state and a tension state. This causes the operator difficulty in regulating mistracking and tension with an extended period.

Since the frame 91 is disposed on the right and left sides of the pulley 94 having the wrapped belt 92, the frame 91 outside the belt 92 needs to be disassembled to remove the belt 92 from the pulley 94 during replacement of the belt 92. After the replacement of the belt 92, the disassembled frame 91 needs to be reassembled. Since the shaft 96 is removed from the frame 91 at the time of disassembling of the frame 91, the positional relationship between the reassembled frame 91 and the shaft 96 is reset to the initial assembling state of the frame 91. Thus, even if a mistracking state and a tension state are properly set before disassembling, it is necessary to regulate mistracking and tension again through the difficult and time-consuming operation after reassembling. Therefore, in the conventional method of FIG. 7, the replacement of the belt 91 requires disassembling and reassembling of the frame 91 and regulation of mistracking and tension from the initial assembling state of the frame 91. For this reason, the conventional method considerably consumes much time and effort of an operator.

Moreover, the method using the weight requires a space for installing the weight under the conveyor device and thus is not applicable to a conveyor device that transports an article on a transporting surface located near the floor surface of equipment, that is, a so-called low profile conveyor.

An object of the present invention is to provide a conveyor device that reduces time and effort for regulating mistracking and replacing belts and eliminates the need for a large space for a mistracking regulating mechanism.

SUMMARY OF THE INVENTION

In order to solve the problems, a conveyor device according to the present invention includes: at least two rotating members that are rotatably supported by at least two reference shafts, respectively, the reference shafts extending along reference axes parallel to each other; and a wrapping member wrapped between the rotating members, the wrapping member being circulated between the rotating members by rotating the rotating members, wherein at least one of the rotating members is rotatably supported by the reference shaft via a bearing, the conveyor device further includes an adjustment collar disposed between the bearing and the reference shaft, the adjustment collar has a collar body, the collar body including an inner hollow part that allows insertion of the reference shaft and an adjustment outer surface capable of supporting the bearing, the adjustment outer surface of the collar body is inclined relative to a direction of the reference axis in a cross section including a reference axis of the reference shaft, and the inclination of the adjustment outer surface in the cross section including the reference axis of the reference shaft is changeable by rotating the adjustment collar relative to the reference shaft.

With this configuration, the inclination of the adjustment outer surface that supports the rotating member, e.g., a pulley via a bearing can be changed relative to the direction of the reference axis. This can change the inclination of the outer surface of the rotating member supported by the adjustment outer surface via the bearing. When the inclination of the outer surface of the rotating member is changed, the position of the wrapping member on the outer surface of the rotating member is changed according to the changed inclination while the wrapping member wrapped around the rotating member revolves between the rotating members.

Since the adjustment collar is disposed between the bearing and the reference shaft, the adjustment collar and the rotating member can separately rotate. In other words, even the adjustment collar rotating during the rotation of the rotating member does not interfere with the rotation of the rotating member. This does not stop revolving the wrapping member, e.g., a belt between the rotating members.

The inclination of the adjustment outer surface relative to the direction of the reference axis means that the reference axis and the outer surface of the collar body are not parallel to each other in the cross section including the reference axis. The cross section including the reference axis (hereinafter may be simply called a cross section) can be set as a plane extending in various directions around the reference axis. The adjustment outer surface may be inclined relative to the reference axis in a cross section extending in any one of the directions. In other words, even if the adjustment outer surface and the reference axis are parallel to each other in a cross section extending in a specific direction, the adjustment outer surface may be inclined relative to the reference axis unless the adjustment outer surface and the reference axis are parallel to each other in a cross section in a different direction. If the adjustment outer surface is inclined relative to the reference axis in a cross section extending in a specific direction, the adjustment collar rotating around the reference shaft from this state changes the inclination angle of the adjustment outer surface relative to the reference axis in the specific cross section. At a certain rotation angle, the adjustment outer surface and the reference axis may be parallel to each other in a specific cross section. At this point, the adjustment outer surface is inclined relative to the reference axis in a cross section extending in a different direction. The changeable inclination of the adjustment outer surface may indicate that an angle formed by the adjustment outer surface (inclination angle) is changeable relative to the reference axis in a specific cross section. Alternatively, the changeable inclination may indicate a changeable direction of a cross section (the direction of inclination) showing inclination of the reference axis and the adjustment outer surface.

In addition to the configuration, the conveyor device according to the present invention includes a driving source that generates a rotary driving force, wherein at least one of the rotating members is a driving rotating member that rotates in response to a driving force from the driving source, at least another one of the rotating members is a non-driving rotating member that is rotated via the wrapping member according to a rotation of the driving rotating member, and the driving rotating member rotating in response to the driving force from the driving force revolves the wrapping member between the driving rotating member and the non-driving rotating member, the non-driving rotating member including an adjustment collar that is rotated relative to the reference shaft of the non-driving rotating member so as to change the inclination of the adjustment outer surface in the cross section including the reference axis of the reference shaft, allowing an adjustment of a position of the wrapping member in a lateral direction on an outer surface of the non-driving rotating member while the wrapping member is revolved between the driving rotating member and the non-driving rotating member. The lateral direction may cross a transporting direction of the conveyor device.

With this configuration, the adjustment collar is rotated to regulate mistracking near the non-driving rotating member and thus mistracking can be regulated while the driving rotating member is rotated by a driving force. In other words, mistracking can be regulated without stopping the revolution of the wrapping member, e.g., a belt between the rotating members.

In addition to the configuration, the conveyor device according to the present invention, wherein the collar body of the adjustment collar is cylindrical, and an outside diameter axis and an inside diameter axis may extend in different directions, the outside diameter axis passing through the center of the circumcircle of the adjustment outer surface of the collar body, the inside diameter axis passing through the center of the inscribed circle of the inner hollow part of the collar body.

With this configuration, a manufacturer produces a cylindrical member from a material by lathing or the like and then forms a diagonal hole on the cylinder, or produces a hollow cylindrical member and then diagonally shaves the outer surface of the cylindrical member. This method can relatively easily produce the adjustment collar.

In addition to the configuration, the conveyor device according to the present invention, wherein the adjustment collar has one of an adjustment hole and an adjustment notch on the outer periphery of the adjustment collar, and a rod member may be inserted into one of the adjustment hole and the adjustment notch from the outside and operated so as to rotate the adjustment collar relative to the reference shaft of the rotating member.

With this configuration, an operator can rotate the adjustment roller by a simple method of inserting a rod member, e.g., a hexagonal wrench into the adjustment hole or the adjustment notch from the outside and operating the rod member. This facilitates mistracking regulation.

In addition to the configuration, the conveyor device according to the present invention, wherein a plurality of sets of the rotating members and the wrapping members are arranged in parallel so as to transport an article placed across the wrapping members parallel to each other, one of the rotating members arranged in parallel is located on one end in the placement direction of the rotating members and includes one of the adjustment hole and the adjustment notch of the adjustment collar on one end in the axial direction of the adjustment collar, and the one end having one of the adjustment hole and the adjustment notch in the axial direction is directed to the one end in the placement direction of the rotating members.

With this configuration, the adjustment hole or the adjustment notch provided for regulating mistracking is directed to the side of the overall conveyor device in the multiple-belt conveyor device including at least two narrow belts (wrapping members) arranged in parallel. Thus, the operator can easily insert a hexagonal wrench or the like into the adjustment hole or the adjustment notch and operate the wrench.

In addition to the configuration, the conveyor device according to the present invention, wherein the adjustment collar is a combination of a first adjustment collar piece and a second adjustment collar piece, the first adjustment collar piece and the second adjustment collar piece are identical in shape, the first adjustment collar piece and the second adjustment collar piece each include an inner hollow part that allows the insertion of the reference shaft of the rotating member, an adjustment outer surface capable of supporting the bearing for the rotating member, a flange part on one end of the collar piece in a longitudinal direction, and an engagement part on the other end of the collar piece in the longitudinal direction, and the first adjustment collar piece and the second adjustment collar piece are formed such that if the engagement part of the second adjustment collar piece is engaged with the engagement part of the first adjustment collar piece with the reference shaft inserted into the first adjustment collar piece, the adjustment outer surface of the first adjustment collar piece and the adjustment outer surface of the second adjustment collar piece are both inclined in the same direction in the cross section including the reference axis of the reference shaft.

With this configuration, the adjustment collar including a combination of the first adjustment collar piece and the second adjustment collar piece has flange parts on both ends of the adjustment collar in the axial direction. If a foundation part (base part) like a vertical plane or a support case (frame) that supports the reference shaft is provided on one end of the reference shaft in the axial direction, the attachment of the adjustment collar to the reference shaft brings the end of the adjustment collar in the axial direction into contact with the foundation part like a vertical plane or the support case (the surface of the support case). If the flange parts are provided on both ends of the adjustment collar in the axial direction, this contact is surface contact. Thus, even if the adjustment outer surface is inclined relative to the reference axis of the reference shaft, an axial stress is not concentrated to a point in the contact region of the adjustment collar and the foundation part or the support case, thereby preventing breakage and wear of components including the adjustment collar.

Each of the first adjustment collar piece and the second adjustment collar piece has the flange part only one side in the axial direction. Thus, if the adjustment collar pieces are produced according to a manufacturing method using molds, e.g., injection molding or casting, a completed product is shaped so as to be easily removed (released) from molds. Since the first adjustment collar piece and the second adjustment collar piece are identical in shape, the manufacturer can produce the first adjustment collar piece and the second adjustment collar piece using only one kind of mold. Thus, the manufacturer can easily produce the adjustment collar having flanges on both ends of the collar in the axial direction, according to a method suitable for mass production using molds, for example, injection molding or casting.

In addition to the configuration, the conveyor device according to the present invention, wherein the rotating member provided on one end and/or the other end in the transporting direction of the conveyor device may approach or move away from the other rotating members so as to adjust the tension of the wrapping member wrapped between the rotating members.

With this configuration, mistracking is regulated by the rotation of the adjustment collar, whereas a tension is regulated by changing the position of the rotating member (approaching or moving away from the other rotating members). In other words, mistracking and tension regulation are performed by different operations. When the position of the rotating member is changed, the orientation (rotation angle) of the adjustment collar is not changed. Thus, tension regulation performed by an operator does not change the position of the wrapping member on the surface of the rotating member. This eliminates the need for additional mistracking regulation after the operator regulates a tension in the absence of mistracking.

A method of adjusting the conveyor device according to the present invention is a method of adjusting a conveyor device, the conveyor device including a wrapping member wrapped between a driving rotating member and a non-driving rotating member, the driving rotating member being supported by a driving first reference shaft extending along a first reference axis and rotated by a driving force from a driving source, the non-driving rotating member being supported by a driven second reference shaft extending along a second reference axis parallel to the first reference axis and rotated via a bearing, the wrapping member being revolved between the driving rotating member and the non-driving rotating member in response to the rotation of the driving rotating member so as to transport an article on the wrapping member, the conveyor device further including an adjustment collar between the bearing and the second reference shaft, the adjustment collar including: an inner hollow part that allows insertion of the second reference shaft; and an adjustment outer surface capable of supporting the bearing, the adjustment outer surface being inclined relative to the direction of the first reference axis in a cross section including the first reference axis, the inclination being changeable by rotating the adjustment outer surface around the first reference axis, and when the wrapping member revolves between the driving rotating member and the non-driving rotating member, the adjustment collar is rotated relative to the second reference shaft so as to change the inclination of the adjustment outer surface relative to the direction of the second reference axis in a cross section including the second reference axis, which adjusts the position of the wrapping member on the outer surface of the non-driving rotating member in a direction crossing the transporting direction of the conveyor device.

With this configuration, the operator can regulate mistracking of the wrapping member by rotating the adjustment collar without stopping the revolution while the wrapping member revolves between the driving rotating member and the non-driving rotating member.

In the conveyor device according to the present invention, the rotation of the adjustment collar relative to the reference shaft changes the position of the wrapping member on the outer surface of the rotating member while the wrapping member revolves between the rotating members. Thus, the operator can regulate mistracking by rotating the adjustment collar. This operation only slightly changes the orientation of the rotating member but hardly changes the position of the rotating member along the transporting direction. Thus, even mistracking regulation performed by the operator hardly changes the tension of the wrapping member wrapped around the rotating member. This regulates mistracking independently of tension regulation. The operator does not need to perform additional tension regulation even after mistracking regulation, thereby reducing time and effort for the operation.

For mistracking regulation, the operator does not need to longitudinally move the position of one end of the reference shaft (e.g., a shaft fixed to the frame) while fixing the position of the other end of the reference shaft. Thus, the structure of the conveyor device may not support both ends of the reference shaft, allowing a so-called cantilever conveyor, which supports only one end of the reference shaft, to serve as the structure of the conveyor device according to the present invention. In the cantilever conveyor, the operator longitudinally moves only one end of the reference shaft while keeping the orientation of the reference shaft. This can longitudinally change the position of the overall reference shaft without changing the orientation of the rotating member, e.g., a pulley pivotally supported by the reference shaft. Thus, the operator longitudinally moves the reference shaft to longitudinally change the position of the rotating member, thereby preventing a mistracking state from being affected by tension regulation on the wrapping member, e.g., a belt wrapped around the rotating members. In other words, tension regulation is independent of mistracking regulation, allowing the operator to regulate a tension regardless of the mistracking state. This leads to a simple and time-saving operation.

In a cantilever conveyor, a frame for supporting a reference shaft does not need to be provided on one end of the reference shaft. This allows an operator to approach a wrapping member without disassembling the frame. Thus, the operator does not need to disassemble the frame to replace the wrapping member, e.g., a belt, leading to a simple operation. Moreover, the position of the reference shaft is kept at a state before the replacement of the wrapping member (belt), unless the frame is disassembled. Thus, even if the operator replaces the wrapping member, a mistracking state and a tension state do not change from a state before the replacement. This reduces time and effort for mistracking regulation and tension regulation after the wrapping member is replaced. Mistracking regulation and tension regulation are independent operations. Thus, if operations are performed in stages by the operator, for example, if the operator replaces the wrapping member, regulates a tension, and then regulates mistracking, the tension does not need to be regulated again after mistracking regulation. In other words, this does not cause rewinding to the previous stage, allowing the operator to smoothly perform a series of operations for replacing the wrapping member.

Moreover, the adjustment collar is disposed between the bearing and the reference shaft to implement the conveyor device according to the present invention, leading to quite a small mechanical space for a mistracking regulating mechanism. If the rotating member disposed on one end of a transporting path includes the adjustment collar, particularly, it is not necessary to provide additional mistracking regulating mechanism under the conveyor device. Thus, the present invention is also applicable to a low profile conveyor.

In the method of adjusting the conveyor device according to the present invention, the operator can regulate mistracking without stopping the revolution while the wrapping member, e.g., a belt revolves between the rotating members, thereby keeping a high operating rate of the conveyor device. Furthermore, during mistracking regulation, the operator can quickly confirm whether or not the wrapping member has accurately shifted to a desired position (e.g., the center of the cylindrical side of a pulley).

DETAILED DESCRIPTION OF INVENTION

First Embodiment

Referring to FIGS. 1 to 4, an embodiment of a conveyor device according to the present invention will be described below.

[Conveyor Device]

Figure 1:
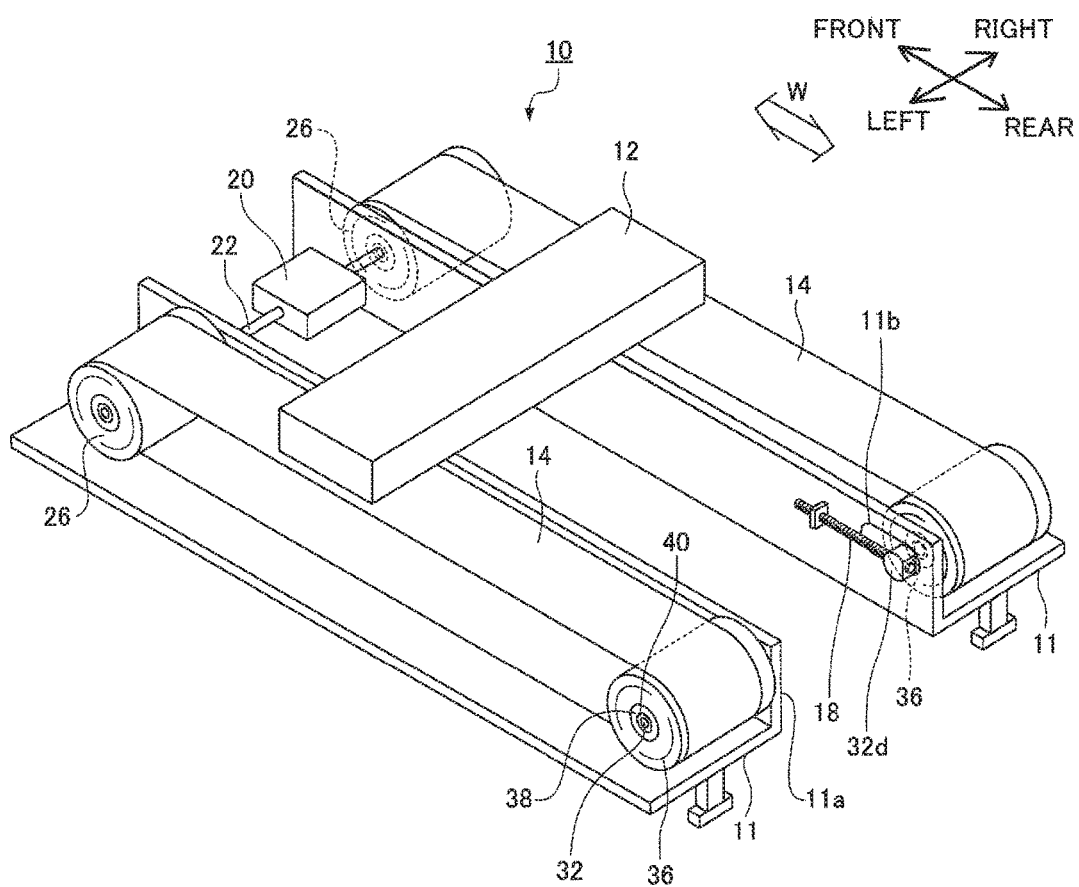
FIG. 1 is a schematic perspective view showing an example of an embodiment of a conveyor device according to the present invention.

FIG. 1 is a schematic perspective view showing a simple illustration of a conveyor device 10 according to the present embodiment. The conveyor device 10 is a double conveyor provided with two belts 14 (an example of a wrapping member) for transporting an article 12 along a transporting direction while supporting the article 12. The article 12 is placed on the top surfaces of the two belts 14 so as to extend across the belts 14, so that the article 12 is transported while being supported on the belts 14. Hereinafter, the transporting direction W of the article 12 will be also referred to as a longitudinal direction, a direction crossing the transporting direction W (the placement direction of the two belts 14) will be referred to as a lateral direction, and one side of the transporting direction W will be referred to as a front side while the other side will be referred to as the rear side. As indicated by arrows in FIG. 1, front/rear/left/right are discriminated from one another with respect to the front side.

The belts 14 are each wrapped around a driving pulley 26 and a non-driving pulley 36 that are two rotating members longitudinally provided along the transporting direction W. The driving pulley 26 and the non-driving pulley 36 are rotated to revolve the belt 14 between the driving pulley 26 and the non-driving pulley 36.

[Driving Pulley]

The driving pulley 26 is disposed on the front end in the revolution range of the belt 14 in FIG. 1. The driving pulley 26 is connected to a driving shaft 22 (a reference shaft near the driving pulley 26) that rotates about a reference axis in response to a rotary driving force from a driving source 20 that generates a rotary force using a motor or the like. In this case, the reference axis is an axis relative to the rotation of the driving pulley 26. In the present embodiment, a horizontal direction (lateral direction in FIG. 1) is the direction of the reference axis.

The driving shaft 22 is extended along the reference axis and is connected to the right and left driving pulleys 26 in FIG. 1. The two driving pulleys 26 rotate with the driving shaft 22 so as to revolve the two belts 14 wrapped around the right and left driving pulleys 26, respectively.

[Non-Driving Pulley]

The non-driving pulley 36 is disposed on the rear end in the revolution range of the belt 14 in FIG. 1. The rotation of the driving pulley 26 is transmitted to the non-driving pulley 36 via the belt 14, rotating the non-driving pulley 36.

The non-driving pulley 36 is supported by a shaft 32 (a reference shaft near the non-driving pulley 36) via bearings 38, the shaft 32 being attached to a frame 11 that is fixed or stably mounted on, for example, a facility bottom. Furthermore, an adjustment collar 40 is disposed between the bearings 38 and the shaft 32.

The positional relationship among the shaft 32, the non-driving pulley 36, the bearings 38, and the adjustment collar 40 will be discussed below. The outer surface (around which the belt 14 is wrapped) of the non-driving pulley 36 laterally extending in FIG. 1 has a cylindrical side while the inner periphery of the non-driving pulley 36 has a shaft hole laterally formed through the non-driving pulley 36. The shaft 32, the adjustment collar 40, and the bearings 38 are sequentially disposed in the shaft hole from the inner periphery.

This layout will be more specifically discussed below. First, the shaft 32 for the right non-driving pulley 36 and the shaft 32 for the left non-driving pulley 36 are separate members that extend along a common reference axis parallel to the reference axis of the driving shaft 22.

The shaft 32 is inserted into the inner hollow part of the adjustment collar 40, which will be specifically described later, and is surrounded by the adjustment collar 40. The bearings 38 (e.g., ball bearings or sleeve bearings) is disposed outside the adjustment collar 40. Moreover, the non-driving pulley 36 is disposed outside the bearings 38.

The shaft 32 is fixed to the frame with the bearings 38 interposed between the shaft 32 (and the adjustment collar 40) and the non-driving pulley 36. Thus, even a rotation of the non-driving pulley 36 in response to a revolution of the belt 14 does not rotate the shaft 32 and the adjustment collar 40.

[Adjustment Collar]

Figure 2:
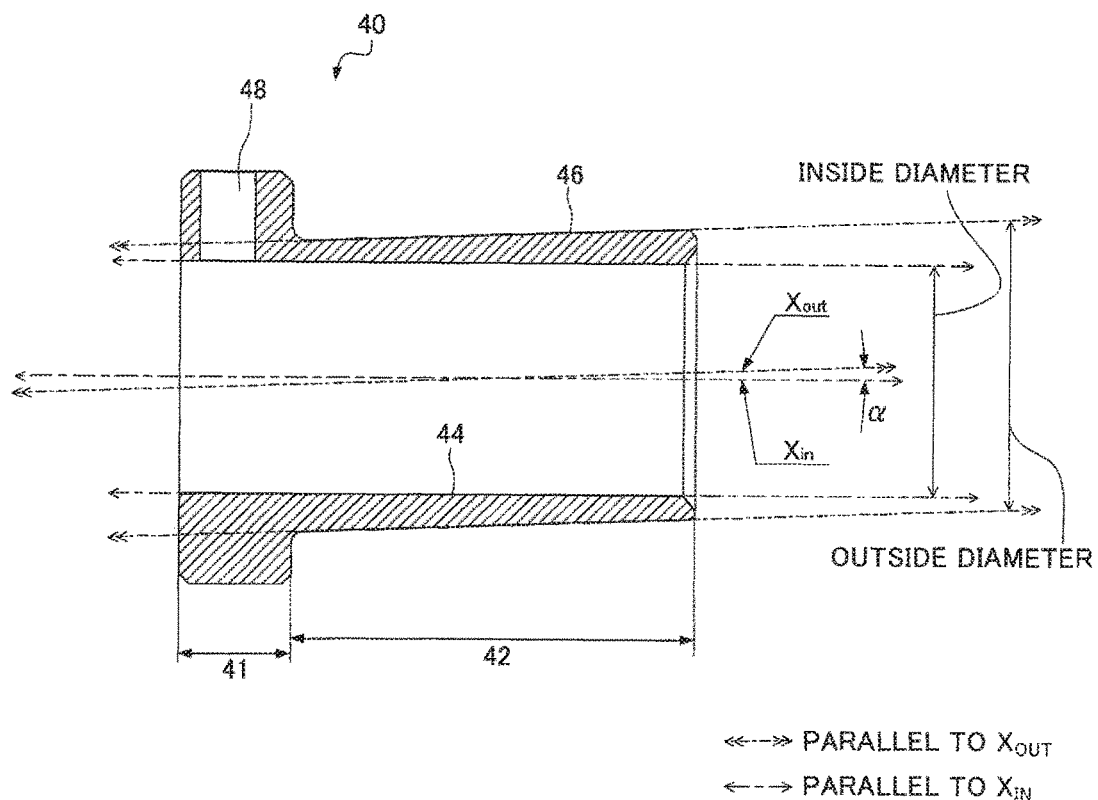
FIG. 2 is a side view of an adjustment collar included in the conveyor device according to the embodiment according to the present invention.

As shown in FIG. 2, the adjustment collar 40 surrounding the shaft 32 is entirely shaped like a cylinder having a flange part 41 and a collar body 42. If a lateral direction in FIG. 2 is a longitudinal direction or an axial direction, the flange part 41 is one end in the longitudinal direction of the adjustment collar 40 (the left side of FIG. 2) while the other part of the adjustment collar 40 is the collar body 42.

Both of the flange part 41 and the collar body 42 are shaped like a double circle in cross section when cut perpendicularly to the longitudinal direction. On the inner circle (inscribed circle) of the double circle, the flange part 41 has a diameter, that is, an inside diameter that is equal to that of the collar body 42; whereas on the outer circle (circumcircle) of the double circle, the flange part 41 has a diameter, that is, an outside diameter that is larger than that of the collar body 42.

[[Collar Body]]

The collar body 42 has a through hole opened in the longitudinal direction of the cylinder (a direction connecting circular faces on both ends). In other words, the collar body 42 has a cylindrical shape slightly different from an ordinary cylinder. In this case, "ordinary cylinder" is defined as a right circular cylindrical member with a longitudinal through hole shaped like a right circular cylinder with a circular bottom that is coaxial with and is smaller in diameter than the circular bottom of the right circular cylindrical member.

In the explanation of a difference between the ordinary cylinder and the collar body 42, "inside diameter axis" and "outside diameter axis" are defined as follows:
Inside diameter axis: an axis passing through the centers of a plurality of inscribed circles arranged in the longitudinal direction of the member
Outside diameter axis: an axis passing through a plurality of circumcircles arranged in the longitudinal direction of the member The inside diameter and the outside diameter of an ordinary cylinder are coaxial with each other. In the collar body 42, however, the inside diameter and the outside diameter are not coaxial with each other. Specifically, as shown in FIG. 2, an outside diameter axis $X_{out}$ of the collar body 42 is inclined relative to an inside diameter axis $X_{in}$ by an angle $\alpha$ (e.g., 1°).

The inner surface of the collar body 42 and a hollow part surrounded by the inner surface will be hereinafter referred to as an inner hollow part 44, and the outer surface of the collar body 42 will be hereinafter referred to as an adjustment outer surface 46. The inner hollow part 44 continues to the interior of the flange part 41 as well as the collar body 42. The adjustment outer surface 46 only means the outer surface of the collar body 42 but the outer surface of the flange part 41 does not belong to the adjustment outer surface 46.

As described above, the outside diameter axis $X_{out}$ is inclined relative to the inside diameter axis $X_{in}$. Thus, the adjustment outer surface 46 to be defined as a set of circumcircles drawn around the outside diameter axis $X_{out}$ is inclined by the angle $\alpha$ (inclined upward in FIG. 2) relative to the cross section shown in FIG. 2 (a cross section including both of the inside diameter axis $X_{in}$ and the outside diameter axis $X_{out}$). With this configuration, the wall thickness of the collar body 42 (a distance from the inner surface to the outer surface) is not uniform in the circumferential and longitudinal directions of the collar body 42. In the cross-sectional view shown in FIG. 2, the lower part shown in FIG. 2 decreases in wall thickness toward one end of the adjustment collar 40, that is, toward one end from the flange part 41, whereas the upper part shown in FIG. 2 increases in wall thickness toward one end of the adjustment collar 40, that is, toward one end from the flange part 41.

The outside diameter of the flange part 41 is shaped like a circle around the inside diameter axis $X_{in}$. Thus, the outer surface of the flange part 41 is inclined relative to the adjustment outer surface 46 by an angle $-\alpha$. Specifically, the outer surface of the flange part 41 is reversely inclined by an angle having the same absolute value as the inclination of the outside diameter axis $X_{out}$ relative to the inside diameter axis $X_{in}$. This also means that the adjustment outer surface 46 is inclined by the angle $\alpha$ when viewed from the outer surface of the flange part 41.

The collar body 42 having such a shape can be produced by forming a through hole on an inclined right circular cylindrical member produced by a manufacturer, or obliquely shaving the outer surface of an ordinary cylindrical member produced by the manufacturer. If the manufacturer also forms the flange part 41, the right circular cylindrical member or the ordinary cylindrical member may be produced such that a cylindrical column or a cylinder is first produced with a large outside diameter (the outside diameter of the flange part 41) and then the outer surface of a part to be formed into the collar body 42 (a part other than the end to be formed into the flange part 41 in the longitudinal direction) is shaved to reduce the outside diameter. Furthermore, a part to be formed into a corner is preferably chamfered when necessary.

[[Adjustment Hole]]

As shown in FIG. 2, the flange part 41 has an adjustment hole 48. The adjustment hole 48 is formed perpendicularly to the outer surface of the flange part 41 and is sized so as to be inserted with a rod member, e.g., a hexagonal wrench inserted by an operator during an operation for regulating mistracking, which will be discussed later. For example, if the operator inserts a hexagonal wrench with an opposite side dimension of 4 mm, the adjustment hole 48 may have an inside diameter of about 4.8 mm.

<Layout of Members Around the Shaft>

Figure 3:
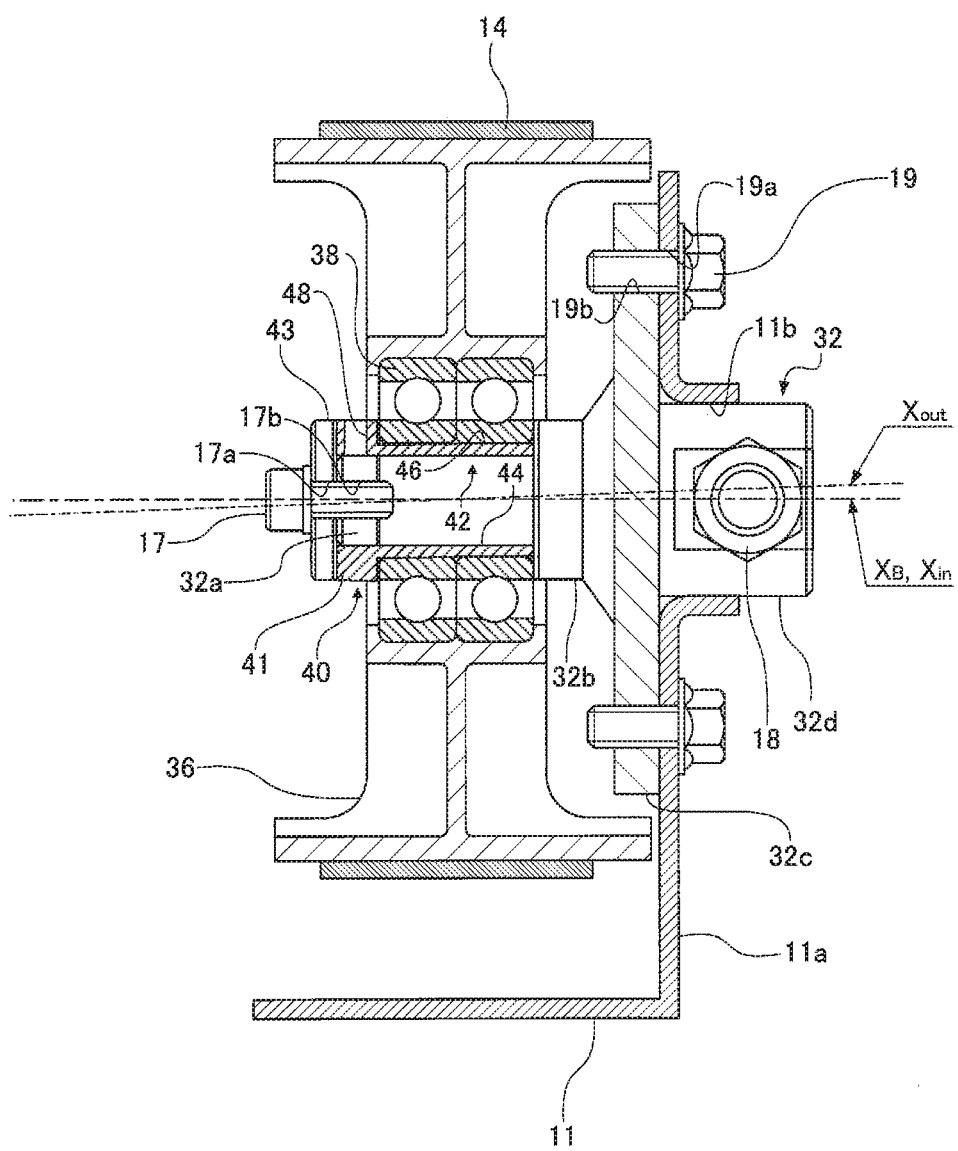
FIG. 3 is a cross-sectional view showing the layout of a reference shaft, bearings, and an adjustment collar in the conveyor device of the embodiment according to the present invention.

FIG. 3 shows that the adjustment collar 40, the bearings 38, and the non-driving pulley 36 are attached to the shaft 32 serving as a reference shaft. FIG. 3 shows the left non-driving pulley 36 of the conveyor device 10 shown in FIG. 1. FIG. 3 is a cross-sectional view of the non-driving pulley 36 that is cut along a vertical plane including the reference axis of the shaft 32 and is viewed from the rear side.

As shown in FIG. 3, the shaft 32 is attached to a perpendicular plane 11a and is fixed or stably mounted on a mounting surface, e.g., the floor surface of a conveyor facility (e.g., a product distribution center) provided with the conveyor device 10. The perpendicular plane 11a of the frame 11 is disposed on the right of the left non-driving pulley 36 of the conveyor device 10 but is disposed on the left of the right non-driving pulley 36. Specifically, in the overall conveyor device 10, the perpendicular plane 11a of the frame 11 is located near the center in the placement direction of the two belts 14 and the two right and left non-driving pulleys 36.

The shaft 32 has several parts: a cylindrical shaft body 32a inserted into the collar body 42 of the adjustment collar 40, a disc-like shaft proximal part 32c for attaching the shaft body 32a to the frame 11, a shaft collar 32b (having an outside diameter larger than that of the shaft body 32a and smaller than that of the shaft proximal part 32c) connecting the shaft body 32a and the shaft proximal part 32c, and a cylindrical shaft grip 32d disposed on the opposite side of the frame 11 from the shaft proximal part 32c when the shaft 32 is attached to the frame 11.

When the shaft 32 is attached to the frame 11, the shaft grip 32d is inserted into a shaft hole 11b (a long hole extended in the longitudinal direction, will be discussed later) provided on the frame 11, and the perpendicular plane 11a of the frame 11 and the disc surface of the shaft proximal part 32c are brought into contact with each other. In this state, shaft mounting bolts 19 (two bolts vertically disposed in this configuration) are screwed into bolt threaded holes 19b, which are provided on the shaft proximal part 32c, through bolt holes 19a (long holes) provided on the perpendicular plane 11a of the frame 11. In this case, if the perpendicular plane 11a of the frame 11 is orthogonal to a floor surface and the shaft body 32a extends perpendicularly to the disc surface of the shaft proximal part 32c, the extending direction of the shaft body 32a, that is, the direction of a reference axis $X_B$ is parallel to the floor surface, in other words, in a horizontal direction.

Before the adjustment collar 40 is attached to the shaft 32, the bearings 38 (two ball bearings axially disposed in this configuration) are fit into the shaft hole of the cylindrical non-driving pulley 36, and the adjustment collar 40 is inserted into the bearings 38 such that the inner surfaces of the bearings 38 come into contact with the adjustment outer surface 46 of the adjustment collar 40. The shaft body 32a is inserted into the inner hollow part 44 of the adjustment collar 40 surrounded by the non-driving pulley 36 and the bearings 38. At this point, the flange part 41 of the adjustment collar 40 is directed opposite to the shaft proximal part 32c, that is, toward one end in the placement direction of the belt 14 and the non-driving pulley 36 in the overall conveyor device 10. If the inside diameter of the inner hollow part 44 is equal to the outside diameter of the shaft body 32a, the inside diameter axis of the collar body 42 agrees with the reference axis $X_B$.

At this point, the shaft 32, the adjustment collar 40, and the bearings 38 are sequentially disposed from the inner periphery in the shaft hole of the non-driving pulley 36. Moreover, it is necessary to take some measures to prevent the adjustment collar 40 from easily dropping from the shaft 32. Thus, a collar mounting disc 43 having substantially the same outside diameter as the flange part 41 of the adjustment collar 40 is brought into contact with the flange part 41 so as to cover one end of the collar body 42 (the opening of the adjustment collar 40) in the longitudinal direction, and a collar mounting bolt 17 is screwed into a bolt threaded hole 17b, which is provided at the center of the end of the shaft body 32a, through a bolt hole 17a provided on the collar mounting disc 43. With this configuration, the adjustment collar 40 is interposed between the shaft collar 32b and the collar mounting disc 43, thereby preventing the adjustment collar 40, the bearings 38 surrounding the adjustment collar 40, and the non-driving pulley 36 from easily dropping from the shaft 32.

After the completion of the attachment of the adjustment collar 40, the bearings 38, and the non-driving pulley 36 to the shaft 32, the belt 14 is wrapped around the outer surface of the non-driving pulley 36.

<Mistracking Regulation>

Figure 4A:
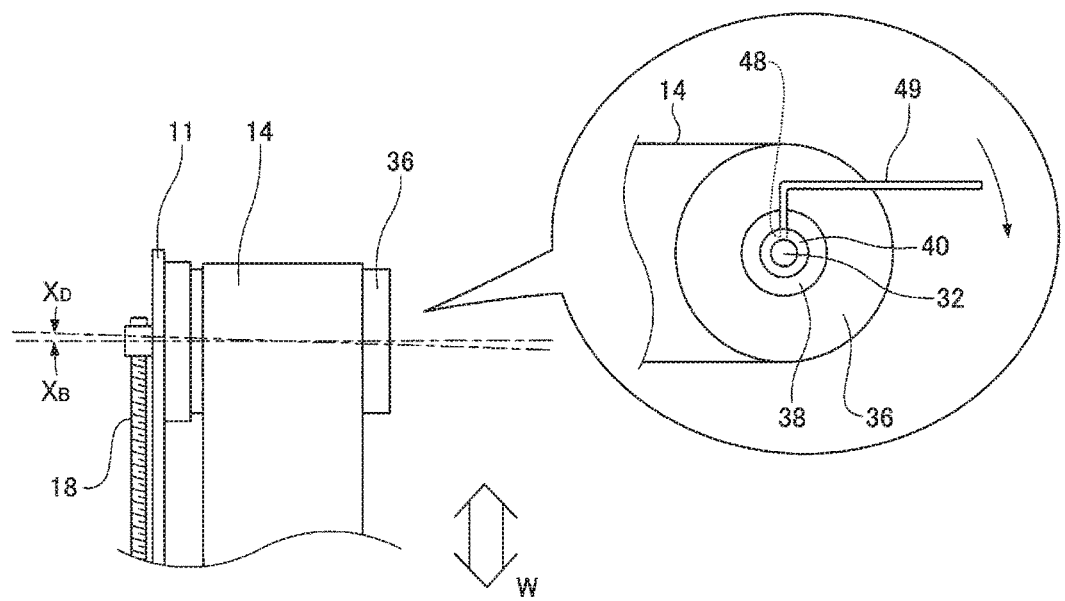
FIGS. 4(A) and 4(B) are plan views showing the state of belt position adjustment in the conveyor device of the embodiment according to the present invention, FIG. 4(A) showing a state before adjustment, FIG. 4(B) showing a state after adjustment.
Figure 4B:
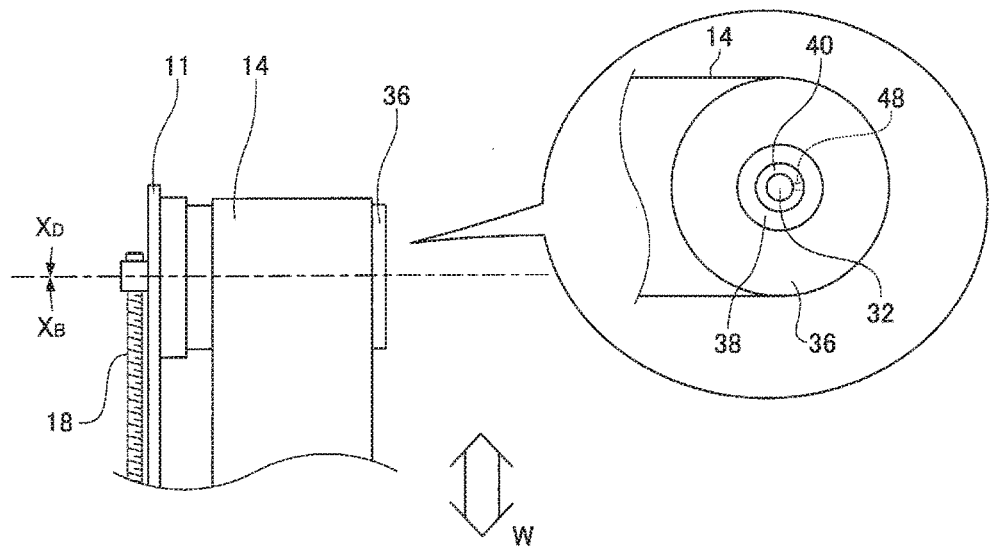

FIGS. 4(A) and 4(B) show position adjustment, that is, mistracking regulation for the belt 14 wrapped around the non-driving pulley 36, on the outer surface of the non-driving pulley 36. FIG. 4(A) shows a state before mistracking regulation for the belt 14 laterally coming slightly close to the frame 11.

For the sake of explanation, it is assumed that mistracking is caused by inclination of the non-driving pulley 36. Specifically, it is assumed that a non-driving rotation axis $X_D$ at the center of the rotation of the non-driving pulley 36 is longitudinally inclined with respect to the reference axis $X_B$ by insufficient dimensional accuracy or aging degradation of various members.

If an operator changes the direction of the non-driving rotation axis $X_D$ to agree with the reference axis $X_B$, the position of the belt 14 revolving between the driving pulley 26 and the non-driving pulley 36 is laterally changed to the center on the non-driving pulley 36 by the influence of crowning (not shown) performed on the outer surface of the non-driving pulley 36.

In the case of mistracking regulation, the operator prepares a rod member to be inserted into the adjustment hole 48 of the adjustment collar 40, for example, a hexagonal wrench 49. As indicated by a balloon on the right side of FIG. 4(A), one end of the hexagonal wrench 49 is then inserted into the adjustment hole 48 and the other end of the hexagonal wrench 49 is rotated around the shaft 32, rotating the adjustment collar 40 relative to the shaft 32. At this point, if the collar mounting bolt 17 shown in FIG. 3 is firmly screwed, the adjustment collar 40 strongly interposed between the shaft collar 32b and the collar mounting disc 43 may not become rotatable. Thus, the operator may optionally loosen the collar mounting bolt 17. The adjustment collar 40 may be rotated during the revolution of the belt 14 between the driving pulley 26 and the non-driving pulley 36.

The adjustment collar 40 rotating relative to the shaft 32 changes the inclination of the adjustment outer surface 46 relative to the reference axis $X_B$. For example, in the cross section shown in FIG. 3, the adjustment outer surface 46 is vertically inclined relative to the reference axis $X_B$. In this state, the adjustment collar 40 rotated by one fourth around the shaft 32 (90°) places the adjustment outer surface 46 in parallel with the reference axis $X_B$ in the cross section of FIG. 3 and vertically (longitudinally) inclines the adjustment outer surface 46 relative to the plane of FIG. 3.

FIG. 4(B) shows the result of rotating the adjustment collar 40 one fourth around the shaft 32 from the state of FIG. 4(A). When the rotation of the adjustment collar 40 changes the inclination of the adjustment outer surface 46, the rotation also changes the inclinations of the bearings 38, which is supported on the adjustment outer surface 46, and the non-driving pulley 36. For example, if the adjustment outer surface 46 vertically inclined in the state of FIG. 4(A) is longitudinally inclined in the state of FIG. 4(B), the bearings 38 and the non-driving pulley 36 are also longitudinally inclined. This changes the direction of the non-driving rotation axis $X_D$ of the non-driving pulley 36 in the longitudinal direction. If the direction of the non-driving rotation axis $X_D$ is changed so as to cancel the longitudinal inclination of the non-driving rotation axis $X_D$ relative to the reference axis $X_B$ shown in FIG. 4(A), the non-driving rotation axis $X_D$ agrees with the reference axis $X_B$ as shown in FIG. 4(B). If the belt 14 revolves between the driving pulley 26 and the non-driving pulley 36 while the non-driving rotation axis $X_D$ agrees with the reference axis $X_B$, the position of the belt 14 laterally changes to the center on the non-driving pulley 36. When the operator confirms that the belt 14 is laterally located at the center on the non-driving pulley 36, the operator decides the completion of mistracking regulation and removes the hexagonal wrench 49 from the adjustment hole 48. If the collar mounting bolt 17 is loosened, the operator screws the collar mounting bolt 17 again.

For the sake of simplification, the non-driving rotation axis $X_D$ agrees with the reference axis $X_B$ when the operator rotates the adjustment collar 40 by 90°. The inclination of the adjustment outer surface 46 relative to the reference axis $X_B$ and the inclination of the non-driving rotation axis $X_D$ relative to the reference axis $X_B$ can be continuously changed according to the rotation angle of the adjustment collar 40. Thus, in actual mistracking regulation, the operator may find a proper rotation angle by changing the rotation angle of the adjustment collar 40 to various angles while revolving the belt 14 between the driving pulley 26 and the non-driving pulley 36, so that the belt 14 is located at the center on the non-driving pulley 36.

<Tension Regulation>

In the conveyor device 10, if the belt 14 wrapped around the non-driving pulley 36 does not have a desirable tension, for example, if the belt 14 is loosened or excessively tightened, a tension is regulated.

As shown in FIG. 3, the shaft 32 is attached to the frame 11 with the multiple shaft mounting bolts 19. The bolt holes 19a where the shaft mounting bolts 19 are inserted and the shaft hole 11b where the shaft grip 32d is inserted are long holes extended in the longitudinal direction. Thus, loosening of the shaft mounting bolt 19 in the bolt threaded hole 19b by the operator allows the shaft 32 to longitudinally move in the range of the bolt hole 19a and the shaft hole 11b.

If the operator rotates a tension adjustment bolt 18 with the loosened shaft mounting bolt 19, the tension adjustment bolt 18 longitudinally extending through the shaft grip 32d, the shaft 32 screwed with the tension adjustment bolt 18 longitudinally moves along the tension adjustment bolt 18. Thus, the non-driving pulley 36 supported by the shaft 32 (via the adjustment collar 40 and the bearings 38) also longitudinally moves with the shaft 32. This moves the non-driving pulley 36 close to or away from the driving pulley 26 shown in FIG. 1. In other words, a longitudinal distance between the driving pulley 26 and the non-driving pulley 36 changes. The tension of the belt 14 wrapped between the driving pulley 26 and the non-driving pulley 36 increases as a longitudinal distance between the pulleys increases, and decreases as the distance decreases. Thus, the operator can tighten the loosened belt 14 by separating the non-driving pulley 36 from the driving pulley 26, or can loosen the excessively tightened belt 14 by moving the non-driving pulley 36 close to the driving pulley 26. This can properly regulate the tension of the belt 14.

Second Embodiment

Figure 5:
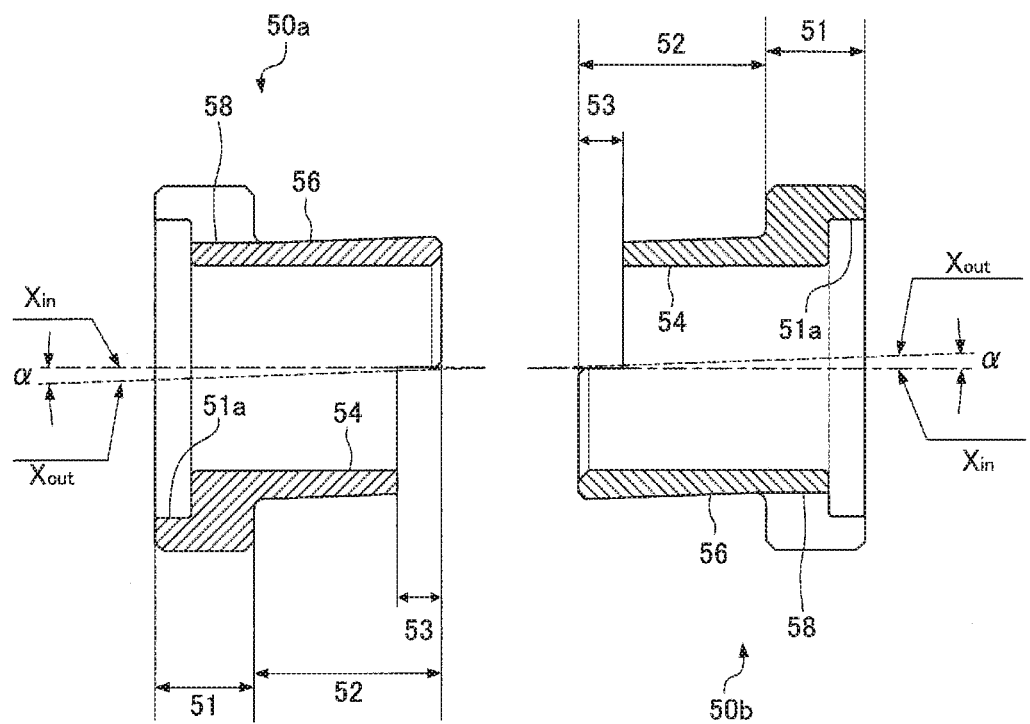
FIG. 5 is a side view showing an adjustment collar piece used in another example of the embodiment.
Figure 6:
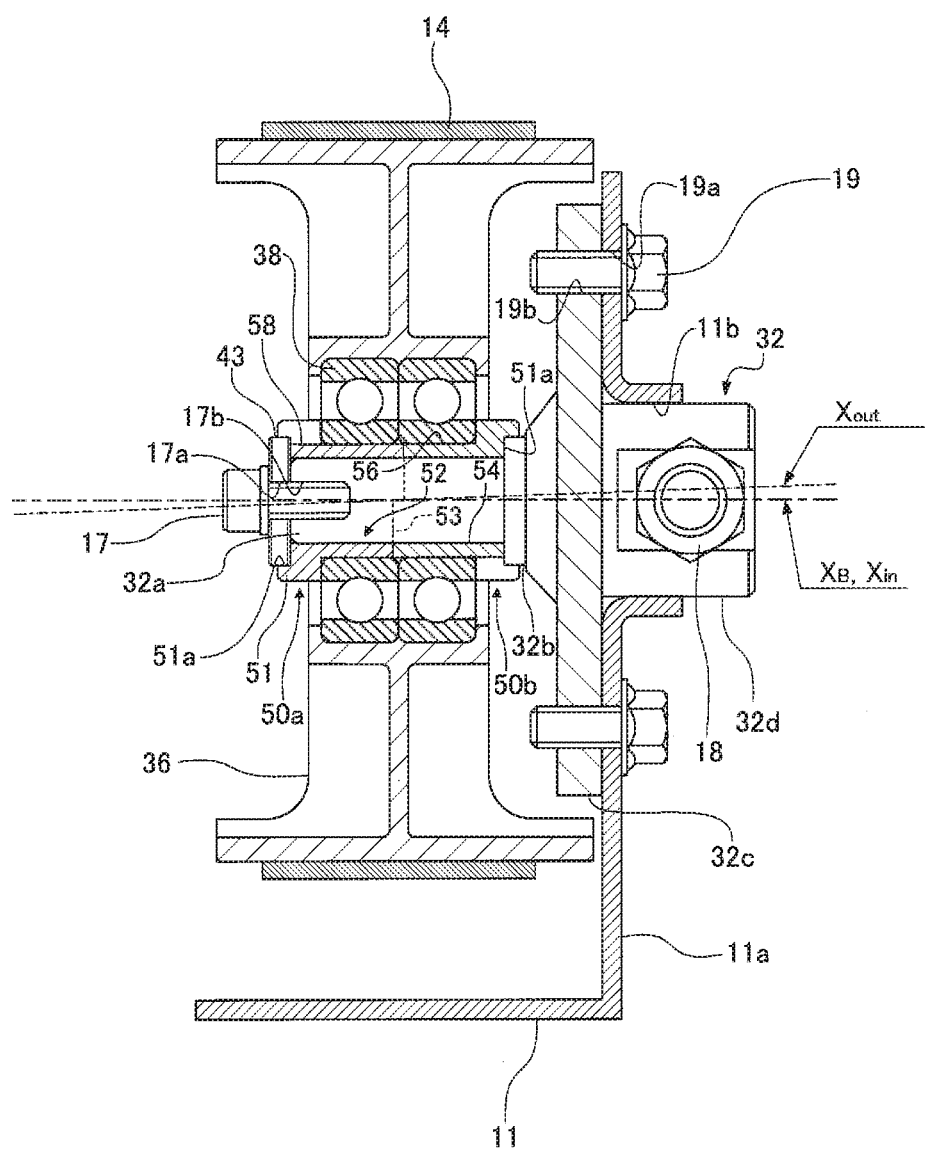
FIG. 6 is a side view showing the layout of a reference shaft, bearings, and an adjustment collar in a conveyor device according to another example of the embodiment.
Figure 7:
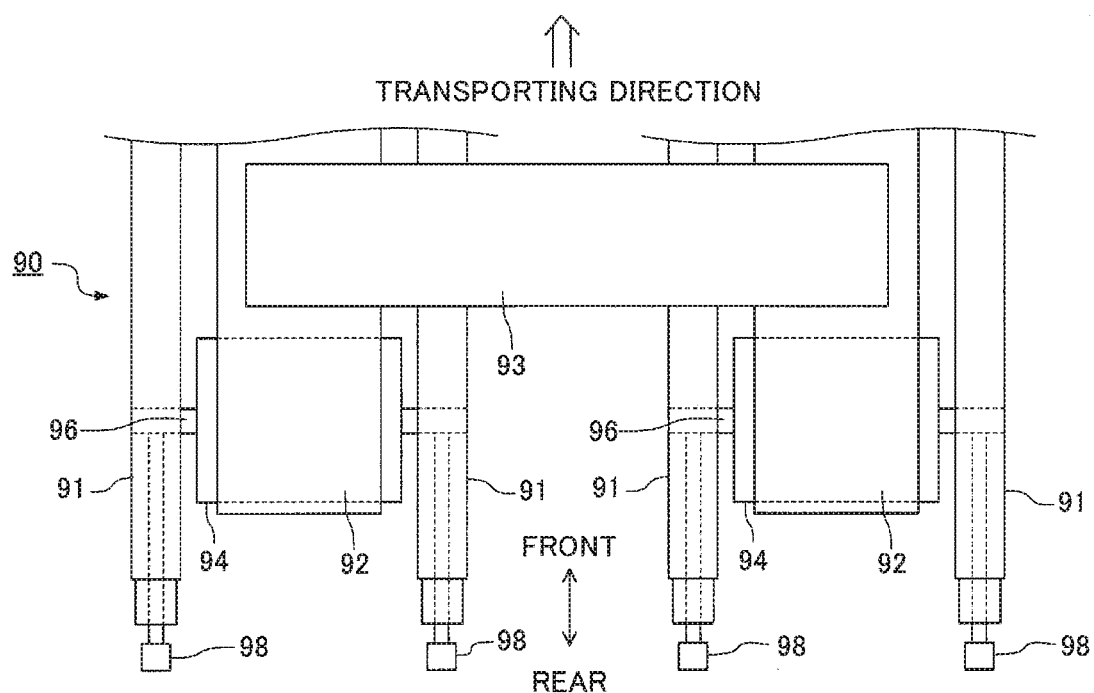
FIG. 7 is a plan view showing a state of mistracking regulation in a conveyor device according to the related art.

Referring to FIGS. 5 and 6, another embodiment of a conveyor device 10 according to the present invention will be described below. The overall configuration of the conveyor device 10 according to the present embodiment is identical to that of the first embodiment shown FIG. 1. In the present embodiment, the adjustment collar 40 shown in FIG. 2 is replaced with two members: a first adjustment collar piece 50a and a second adjustment collar piece 50b shown in FIG. 5.

[Adjustment Collar Piece]

The first adjustment collar piece 50a and the second adjustment collar piece 50b shown in FIG. 5 circumferentially cover a shaft 32 like the adjustment collar 40 of FIG. 2. As shown in FIG. 5, these members are entirely cylindrical and each include a flange part 51 and a collar body 52. The collar body 52 is identical in shape to the collar body 42 of the adjustment collar 40 in FIG. 2 except that the collar body 52 is axially (longitudinally) shorter (about a half length) than the collar body 42 of the adjustment collar 40 shown in FIG. 2, and the collar body 52 includes an engagement part 53, which will be described later, on one end opposite to the flange part 51 in the axial direction. Specifically, the collar body 52 includes an inner hollow part 54 and an adjustment outer surface 56 with an inside diameter axis $X_{in}$ and an outside diameter axis $X_{out}$ in different directions. Thus, the inner wall surface of the inner hollow part 54 of the collar body 52 is parallel to the inside diameter axis $X_{in}$, whereas the outer wall surface of the adjustment outer surface 56 is inclined relative to the inside diameter axis $X_{in}$ by an angle α (equal to an angle between inside diameter axis $X_{in}$ and the outside diameter axis $X_{out}$) in the cross section of FIG. 5.

The first adjustment collar piece 50a and the second adjustment collar piece 50b are identical in shape, that is, members of the same shape. In the plane of FIG. 5, the second adjustment collar piece 50b is rotated by 180° with respect to the first adjustment collar piece 50a. FIG. 5 shows that the engagement part 53 of the first adjustment collar piece 50a and the engagement part 53 of the second adjustment collar piece 50b face each other.

[[Engagement Part]]

The engagement parts 53 are formed such that when the second adjustment collar piece 50b is rotated about the axis with respect to the first adjustment collar piece 50a by 180°, the engagement parts 53 are engaged with each other to join the collar bodies 52 into a cylindrical shape. In this configuration, the engagement part 53 is shaped like a semicircle around the wall of the collar body 52. If the first adjustment collar piece 50a and the second adjustment collar piece 50b face each other as shown in FIG. 5 with the engagement parts 53 formed thus, a wall part (remaining part) of the collar body 52 in the engagement part 53 is engaged with a cut part (notch) of the wall of the collar body 52 in the engagement part 53.

[[Flange Part and Adjustment Notch]]

The flange part 51 of each of the first adjustment collar piece 50a and the second adjustment collar piece 50b has a larger outside diameter than the collar body 52 like the flange part 41 of the adjustment collar 40 of FIG. 2. Whereas as for the inner surface, near the right collar body 52 in FIG. 5, the flange part 51 has a continuous inner surface from the inner hollow part 54 and has the same inside diameter as the inner hollow part 54. The flange part 51 slightly expands away from the left collar body 52 in FIG. 5. Specifically, a flange inner step 51a slightly larger in inside diameter than the inner hollow part 54 is provided on one end of the flange part 51 in the axial direction (the opposite side from the collar body 52). The inside diameter of the flange inner step 51a may be substantially equal to the outside diameter of a shaft collar 32b of the shaft 32 and the outside diameter of a collar mounting disc 43 as shown in FIGS. 3 and 6.

The outer periphery of the flange part 51 has an adjustment notch 58. The adjustment notch 58 is a rectangular notch that is an opened side on each end (near the collar body 52 and the opposite side) of the flange part 51 in the axial direction. The adjustment notch 58 is sized so as to be inserted with a rod member, e.g., a hexagonal wrench by an operator during an operation for regulating mistracking, which will be discussed later. For example, when the operator inserts a hexagonal wrench with an opposite side dimension of 4 mm, the adjustment notch 58 may have a width of about 4.8 mm.

<Combination of the Adjustment Collar Pieces>

FIG. 6 shows that the first adjustment collar piece 50a and the second adjustment collar piece 50b are attached to the shaft 32 with bearings 38 and a non-driving pulley 36. FIG. 5 is a cross-sectional view showing, as in FIG. 3, the left non-driving pulley 36 of the conveyor device 10 shown FIG. 1. In FIG. 5, the non-driving pulley 36 is cut along a vertical plane including the reference axis of the shaft 32 and is viewed from the rear side.

The shaft 32 is attached to a frame 11 as in FIG. 3. When attaching the first adjustment collar piece 50a and the second adjustment collar piece 50b to the shaft 32, the operator first inserts a shaft body 32a into an inner hollow part 54 of the adjustment collar piece (in this configuration, the second adjustment collar piece 50b) near a shaft proximal part 32c. At this point, the operator directs the flange part 51 of the second adjustment collar piece 50b toward the shaft proximal part 32c. This fits the shaft collar 32b to the flange inner step 51a of the flange part 51.

Subsequently, the cylindrical non-driving pulley 36 and the bearings 38 (two ball bearings axially disposed in this configuration) fit into the shaft hole of the cylindrical non-driving pulley 36 are disposed around the second adjustment collar piece 50b. Specifically, the shaft body 32a and the second adjustment collar piece 50b are inserted into the inner rings of the bearings 38 such that the inner surfaces (of the inner rings) of the bearings 38 are placed in contact with the adjustment outer surface 56 of the second adjustment collar piece 50b. At this point, if the bearings 38 are two ball bearings arranged in the axial direction, only one of the ball bearings (near the shaft proximal part 32c) is placed in contact with the adjustment outer surface 56 of the second adjustment collar piece 50b.

After that, the operator inserts the collar body 52 of the first adjustment collar piece 50a into the shaft hole of the bearings 38 and the non-driving pulley 36 from the distal end of the shaft body 32a, inserting the shaft body 32a into the inner hollow part 54 of the first adjustment collar piece 50a. At this point, the operator directs the engagement part of the first adjustment collar piece 50a toward the shaft proximal part 32c, allowing the engagement part 53 of the first adjustment collar piece 50a to face the engagement part 53 of the second adjustment collar piece 50b.

Subsequently, any one of the first adjustment collar piece 50a and the second adjustment collar piece 50b is rotated relative to the other (specifically, any one of the collar pieces is rotated about the axis with respect to the other by 180°) so as to move the engagement parts 53 into engagement ("remaining part" fit to "notch"). In this case, if the inside diameter of the inner hollow part 54 of the first adjustment collar piece 50a and the second adjustment collar piece 50b is equal to the outside diameter of the shaft body 32a, the inside diameter axis of the inner hollow part 54 agrees with a reference axis $X_B$ both in the first adjustment collar piece 50a and the second adjustment collar piece 50b. If the engagement parts 53 are engaged with each other, one of the engagement parts 53 is rotated relative to the other by 180° and thus the outside diameter axes $X_{out}$ of the first adjustment collar piece 50a and the second adjustment collar piece 50b are located in the same direction in the same plane. This inclines the adjustment outer surface 56 of the first adjustment collar piece 50a and the adjustment outer surface 56 of the second adjustment collar piece 50b in the same direction relative to the reference axis $X_B$.

At this point, the shaft 32, the first adjustment collar piece 50a, the second adjustment collar piece 50b, and the bearings 38 are sequentially disposed from the inner periphery in the shaft hole of the non-driving pulley 36. Moreover, it is necessary to take some measures to prevent the first adjustment collar piece 50a and the second adjustment collar piece 50b from easily dropping from the shaft 32. Thus, the collar mounting disc 43 having an outside diameter as large as the inside diameter of the flange inner step 51a of the flange part 51 is fit to the flange inner step 51a, and the collar mounting bolt 17 is screwed into a bolt threaded hole 17b provided at the center of the end of the shaft body 32a through a bolt hole 17a provided on the collar mounting disc 43. With this configuration, the first adjustment collar piece 50a and the second adjustment collar piece 50b are interposed between the shaft collar 32b and the collar mounting disc 43, thereby preventing the first adjustment collar piece 50a, the second adjustment collar piece 50b, and the bearings 38 surrounding the adjustment collar pieces, and the non-driving pulley 36 from easily dropping from the shaft 32.

After the completion of the attachment of the first adjustment collar piece 50a, the second adjustment collar piece 50b, the bearings 38, and the non-driving pulley 36 to the shaft 32 in this way, the belt 14 is wrapped around the outer surface of the non-driving pulley 36.

<Mistracking Regulation/Tension Regulation>

As in the first embodiment, mistracking can be regulated for the belt 14 in the present embodiment where the first adjustment collar piece 50a and the second adjustment collar piece 50b are used. Specifically, the operator optionally loosens the collar mounting bolt 17 and inserts a rod member, e.g., a hexagonal wrench into the adjustment notch 58 of the first adjustment collar piece 50a to operate the rod member. Thus, the first adjustment collar piece 50a and the second adjustment collar piece 50b are rotated relative to the shaft 32. This changes the inclination of the adjustment outer surface 46 with respect to the reference axis $X_B$ and laterally changes the position of the belt 14 on the non-driving pulley 36, the belt 14 revolving between the driving pulley 26 and the non-driving pulley 36. Thus, the operator may try out various rotation angles to confirm whether the belt 14 has laterally reached a desired position (e.g., the center). The operator may remove the rod member from the adjustment notch 58 and tighten the collar mounting bolt 17 again when the belt 14 reaches the desired position.

In this case, the operator directly rotates only the first adjustment collar piece 50a but transmits the rotation around the axis of the first adjustment collar piece 50a to the second adjustment collar piece 50b through the engagement part 53. This can rotate both of the first adjustment collar piece 50a and the second adjustment collar piece 50b.

Furthermore, in the present embodiment, the tension of the belt 14 can be regulated using the tension adjustment bolt 18 as in the first embodiment.

Advantages of the Embodiments

According to the present embodiment, the operator can change the orientation of the non-driving pulley 36, which is supported around the adjustment collar 40, by a simple operation of rotating the adjustment collar 40 relative to the shaft 32. This can adjust the position of the belt 14 on the outer surface of the non-driving pulley 36, that is, regulate mistracking when the belt 14 revolves between the driving pulley 26 and the non-driving pulley 36.

When the adjustment collar 40 is rotated, only the orientation of the non-driving pulley 36 is slightly changed but the position of the non-driving pulley 36 is not longitudinally changed. Thus, mistracking regulation does not change a distance between the non-driving pulley 36 and the driving pulley 26, thereby keeping the tension of the belt 14. Unlike in a conventional mechanism for mistracking regulation, this eliminates the need for regulating a tension again after the operator regulates mistracking, leading to a simple and time-saving operation. The rotation of the adjustment collar 40 longitudinally changes the inclination of the non-driving pulley 36 as shown in FIGS. 4(A) and 4(B) and also slightly changes the inclination of the non-driving pulley 36 in the vertical direction as shown in FIG. 3. This may slightly incline the top surface, that is, the transporting surface of the belt 14 but a small inclination angle of about 1° does not interfere with transportation. If the belt 14 has a small width, some inclination does not cause a considerable change on the top surface of the belt 14. Moreover, since the conveyor device 10 of the first embodiment is a double conveyor in which the two belts 14 are laterally disposed as shown in FIG. 1, even a small change of one of the right and left belts 14 does not affect the transporting capability of the conveyor device 10 because the article 12 is supported by the other belt 14.

Moreover, a small region around the shaft 32 supporting the non-driving pulley 36 is a mechanical space for providing the adjustment collar 40, which is a mistracking regulating member in the first embodiment, in the conveyor device 10. This eliminates the need for additional mistracking regulating mechanism under the conveyor device 10, thereby applying the first embodiment to a low profile conveyor. The first embodiment is also applicable to an existing conveyor device. In the application of the first embodiment to an existing conveyor device, the mounted shaft may be covered with the adjustment collar 40 and the already used bearing may be replaced with another bearing increased in inside diameter according to the wall thickness of the adjustment collar 40.

Furthermore, in the first embodiment, the adjustment collar 40 is provided on the non-driving pulley 36 and thus the operator can regulate mistracking while rotating the adjustment collar 40 relative to the shaft 32 with the driving pulley 26 rotated by a driving force from the driving source 20. In other words, the operator can regulate mistracking when the belt 14 revolves between the driving pulley 26 and the non-driving pulley 36, and thus the conveyor device 10 does not need to stop the transportation of the article 12, thereby keeping a high operating rate of the conveyor device 10. A crown effect for moving the belt 14 to a protruding part of crowning appears during revolution between the driving pulley 26 and the non-driving pulley 36. The operator regulates mistracking while the belt 14 revolves the driving pulley 26 and the non-driving pulley 36, and thus immediately after mistracking regulation, the operator can confirm whether or not the belt 14 is properly moved to a desired position (e.g., the center in the lateral direction on the outer surface of the non-driving pulley 36) by the crown effect.

Furthermore, the adjustment collar 40 used in the first embodiment is a cylinder having the inside diameter axis $X_{in}$ and the outside diameter axis $X_{out}$ extended in different directions. Thus, based on a right cylindrical member easily produced by lathing or an ordinary cylindrical member, a manufacturer can relatively easily produce the adjustment collar 40 by forming an oblique shaft hole or diagonally shaving the outer surface of the cylinder to be inclined.

Since the adjustment hole 48 is provided on the outer surface of the flange part 41 of the adjustment collar 40, the operator can rotate the adjustment collar 40 relative to the shaft 32 during mistracking regulation according to a simple method of operating the hexagonal wrench 49 inserted into the adjustment hole 48. Furthermore, the flange part 41 is directed to one end in the placement direction of the belt 14 and the non-driving pulley 36 and thus the adjustment hole 48 is located on one end in a lateral direction with respect to the transporting direction W of the conveyor device 10. Thus, the operator who regulates mistracking laterally approaches the adjustment collar 40 of the non-driving pulley 36 from the outside and can insert the hexagonal wrench 49 into the adjustment hole 48. This allows the operator to enter the transporting path of the article 12 and regulate mistracking without interfering with the transportation of the article 12.

The first embodiment provides a so-called cantilever conveyor where the perpendicular plane 11a of the frame 11 having the attached shaft 32 is disposed only on one end in the axial direction of the shaft 32. In the cantilever conveyor, the flange part 41 including the adjustment hole 48 is opposed to the shaft proximal part 32c in contact with the perpendicular plane 11a of the frame 11. Thus, the perpendicular plane 11a of the frame 11 is not provided near the flange part 41. This allows the operator to insert the hexagonal wrench 49 into the adjustment hole 48 and operate the hexagonal wrench 49 without being interfered with by the perpendicular plane 11a of the frame 11.

In tension regulation, the shaft 32, the adjustment collar 40, the bearings 38, and the non-driving pulley 36 kept in a position are only longitudinally shifted along the transporting direction W. Thus, tension regulation does not change the inclination of the non-driving pulley 36 or require the operator to regulate mistracking again because of finishing tension regulation. In other words, the operator can separately regulate tension and mistracking.

Since the perpendicular plane 11a of the frame 11 is not provided near the flange part 41, the operator does not need to disassemble the frame 11 during the replacement of the belt 14. Moreover, the frame 11 is not disassembled and thus after the replacement of the belt 14, the shaft 32 is kept at a position before the replacement of the belt 14, so that the mistracking state and the tension state of the belt 14 before the replacement are not considerably changed. This reduces time and effort for mistracking regulation and tension regulation after the replacement of the belt 14. Specifically, the operator who has replaced the belt 14 only needs to slightly operate the tension adjustment bolt 18 to regulate tension and then slightly rotate the adjustment collar 40 to regulate mistracking, thereby gradually and smoothly performing operations for the replacement of the belt 14.

According to the second embodiment, the first adjustment collar piece 50a and the second adjustment collar piece 50b are combined to achieve the same effect as the adjustment collar 40 of the first embodiment, leading to the same advantage as the first embodiment. Moreover, the combination of the first adjustment collar piece 50a and the second adjustment collar piece 50b includes the flange parts 51 on both ends in the axial direction. Thus, the adjustment collar piece (in this configuration, the second adjustment collar piece 50b) disposed near the shaft proximal part 32c directs the flange part 51 to the shaft collar 32b. In this configuration, if the inside diameter of the flange inner step 51a of the flange part 51 is substantially equal to the outside diameter of the shaft collar 32b, the flange inner step 51a and the shaft collar 32b are fit into surface contact. In the first embodiment, the end face of the collar body 42 in the axial direction is not perpendicular to the reference axis $X_B$ (inclined only by the angle α from the vertical direction) because the inside diameter axis $X_{in}$ and the outside diameter axis $X_{out}$ extend in different directions. Thus, the shaft collar 32b and the end of the collar body 42 come into point contact with each other. In the second embodiment, the flange inner step 51a and the shaft collar 32b come into surface contact with each other and thus the collar mounting bolt 17 is screwed into the bolt threaded hole 17b to attach the first adjustment collar piece 50a and the second adjustment collar piece 50b. When the first adjustment collar piece 50a and the second adjustment collar piece 50b are interposed between the shaft collar 32b and the collar mounting disc 43, a stress generated near the shaft proximal part 32c in the axial direction is spread over the contact surface of the flange inner step Ma and the shaft collar 32b. Thus, the operator can firmly fasten the collar mounting bolt 17 without worrying about an excessive stress in the axial direction, thereby firmly attaching the first adjustment collar piece 50a and the second adjustment collar piece 50b to the shaft 32.

Even if the shaft 32 does not include the shaft collar 32b, the outer surface of the flange part 51 directed to the shaft proximal part 32c in the axial direction comes into contact with the disc-like shaft proximal part 32c, bringing the shaft 32 and the second adjustment collar piece 50b into surface contact with each other. In this case, the outer surface of the flange part 51 in the axial direction is desirably perpendicular to the inside diameter axis $X_{in}$ (agrees with the reference axis $X_B$ when the second adjustment collar piece 50b is attached to the shaft 32) such that the outer surface of the flange part 51 in the axial direction and the shaft proximal part 32c can entirely come into surface contact with each other.

The first adjustment collar piece 50a and the second adjustment collar piece 50b are combined with the flange parts 51 placed on both ends of the combined collar pieces in the axial direction. Each of the first adjustment collar piece 50a and the second adjustment collar piece 50b has the flange part 51 only on one end in the axial direction. Moreover, a part for inserting the rod member is not a hole but the adjustment notch 58 formed by opening each end side of the combined collar pieces in the axial direction. Thus, if a manufacturer produces the first adjustment collar piece 50a or the second adjustment collar piece 50b according to a manufacturing method using molds (matrixes), e.g., injection molding or casting, the completed first adjustment collar piece 50a or second adjustment collar piece 50b can be easily removed (released) from molds. Specifically, the collar piece can be released only by axially moving a mold or a finished product. Since the first adjustment collar piece 50a and the second adjustment collar piece 50b are identical in shape, only one kind of mold may be provided for producing the collar pieces. In the case of solid casting of a cylindrical member having flanges on both ends in the axial direction, such a cylindrical member is typically hard to release and leads to high mass production cost. The first adjustment collar piece 50a and the second adjustment collar piece 50b according to the second embodiment are easily released and can be produced using only one kind of mold, achieving mass production with low cost. Thus, the combination of the first adjustment collar piece 50a and the second adjustment collar piece 50b has the flange parts 51 on both ends in the axial direction, leading to mass production with low cost while making surface contact on the shaft proximal part 32c.

As compared with the size of the adjustment collar 40 in the axial direction according to the first embodiment, the combination of the first adjustment collar piece 50a and the second adjustment collar piece 50b is slightly larger in the axial direction because of the flange part 51 near the shaft proximal part 32c. The shaft collar 32b is stored in the flange inner step 51a near the shaft proximal part 32c (the second adjustment collar piece 50b) while the collar mounting disc 43 is stored in the flange inner step 51a near the end of the shaft 32 (the first adjustment collar piece 50a). This keeps dimensions including the collar mounting disc 43 in the axial direction substantially as large as the adjustment collar 40 of the first embodiment.

In the foregoing embodiments, as shown in FIG. 1, the driving force of the driving source 20 is directly transmitted to the driving shaft 22 and the driving pulley 26. A driving force may be transmitted between the driving source 20 and the driving shaft 22 through power transmission devices such as a gear or a decelerator. When a power transmission device is used, the driving source 20 may be separated from the conveyor device 10.

In the foregoing embodiments, the belt 14 is used as a wrapping member. The belt 14 may have a flat shape revolving between multiple rotating members so as to transport the article 12. For example, a net may be used.

Moreover, in the foregoing embodiments, the belt 14 is supported by the driving pulley 26 and the non-driving pulley 36. If the belt 14 is vertically sagged by its own weight or the load of the article 12, a belt supporter for supporting the belt may be provided. For example, the belt supporter may be a frame horizontal part that horizontally extends so as to support the belt 14. The frame horizontal part is formed by horizontally sagging an upper part and a lower part of the frame 11 or horizontally attaching a separate plate of the frame 11. The belt 14 wrapped around the driving pulley 26 and the non-driving pulley 36 travels on the lower side as well as the upper side having the transporting surface. Thus, the frame horizontal part is desirably provided on each of the upper and lower sides. Alternatively, the frame horizontal part may have supporting rollers provided at regular intervals so as to support the belt 14.

In the foregoing embodiments, the belt 14 is wrapped around the two rotating members (the driving pulley 26 and the non-driving pulley 36) in the longitudinal direction. Three or more rotating members may be provided. In the case of a large distance between the driving pulley 26 and the non-driving pulley 36, particularly, a pulley vertically held and rotated by the belt 14 is desirably disposed between the driving pulley 26 and the non-driving pulley 36 so as to support the belt 14 without causing the weight of the article 12 to vertically sag the belt 14.

Furthermore, in the foregoing embodiments, the conveyor device 10 is configured as a double conveyor including the two narrow belts 14 that are laterally disposed. The conveyor device 10 may be a single-belt conveyor that transports the article 12 with a only single wide belt, or a conveyor having multiple belts, e.g., at least three belts laterally disposed.

Moreover, in the foregoing embodiments, the flange parts 41 and 51 including the adjustment hole 48 or the adjustment notch 58 are directed to the ends of the belt 14 in the placement direction, that is, the ends of the conveyor device 10 in the lateral direction. If a sufficient gap for rotating the adjustment collar 40 is formed between the perpendicular plane 11a of the frame 11 and the non-driving pulley 36 because of the extended shaft collar 32b and the operator approaches the conveyor device 10 from the rear in the transporting direction W and comes between the right and left non-driving pulleys 36 without interfering with the transportation of the article 12, the adjustment hole 48 or the adjustment notch 58 may be located at a position other than the ends of the conveyor device 10 in the lateral direction.

As shown in FIGS. 4(A) and 4(B), in the foregoing embodiments, the operator inserts a rod member, e.g., the hexagonal wrench 49 into the adjustment hole 48 (the adjustment notch 58 in the second embodiment) and operates the rod member so as to rotate the adjustment collar 40. If the flange parts 41 and 51 are largely exposed on the ends in the axial direction, the operator can also rotate the flange parts 41 and 51 held with a hand. In this case, mistracking can be regulated in the absence of the adjustment hole 48 or the adjustment notch 58 or in the absence of a rod member, e.g., the hexagonal wrench 49.

Moreover, in the foregoing embodiments, the conveyor device 10 is a cantilever conveyor where only one end of the shaft 32 in the axial direction is supported by the frame 11 while the other end is not supported. The present invention is also applicable to a bridge-type conveyor where both ends of the shaft 32 are supported by a support case in the axial direction. In the case of a bridge-type conveyor, the support case may have a part that covers one end of the non-driving pulley 36 in the axial direction and is temporarily removed during mistracking regulation, or the adjustment collar 40 may be rotated from the outside of the support case.

As shown in FIGS. 2 and 3, in the foregoing embodiments, the adjustment collar 40 is shaped like a cylinder with the inside diameter axis $X_{in}$ and the outside diameter axis $X_{out}$ extended in different directions. The shape of the adjustment collar 40 is not limited to a cylinder as long as the adjustment outer surface 46 attached to the shaft 32 is inclined relative to the reference axis $X_B$ of the shaft 32 and the adjustment collar 40 is rotated relative to the shaft 32 so as to change the inclination of the adjustment outer surface 46. For example, one half of the circumference of the adjustment collar 40 may be cylindrical (180°) and the other half may be conical (the halves of the circumferences of the adjustment collar 40 and an ordinary cylinder are combined according to the first embodiment) or a through hole may be formed with inside and outside diameter axes extended in different directions relative to a truncated cone.

In the second embodiment, the engagement parts 53 of the first adjustment collar piece 50a and the second adjustment collar piece 50b are formed by cutting halves of the walls of the collar bodies 52. The notch of one of the collar pieces is engaged with the remaining part of the other collar piece. The shape of the engagement part 53 is not limited as long as the adjustment outer surfaces 56 of the first and second adjustment collar pieces 50a and 50b are inclined, when the engagement parts 53 of the first and second adjustment collar pieces 50a and 50b are engaged with each other, in the same direction relative to the reference axis $X_B$ engagement and the rotation of one of the adjustment collar pieces (the first adjustment collar piece 50a) is transmitted to the other adjustment collar piece (the second adjustment collar piece 50b). Specifically, when the orientation of the second adjustment collar piece 50b is axially rotated by 180° relative to the first adjustment collar piece 50a, the engagement parts 53 are desirably engaged with each other. In other examples, the engagement part 53 may include an axially extending protrusion and a notch axially formed at 180° from the protrusion to store the protrusion or include diagonally cut ends in the axial direction.

Having described the invention, the following is claimed:
1. A conveyor device comprising:
a first rotating member rotatably supported by a first reference shaft via a bearing, a second rotating member rotatably supported by a second reference shaft, wherein the first reference shaft is extending along a first reference axis, the second reference shaft is extending along a second reference axis, and the first and second reference axes are parallel to each other;
a wrapping member wrapped between the rotating members, the wrapping member being circulated between the rotating members by rotating the rotating members; and
an adjustment collar disposed between the bearing and the first reference shaft of the first rotating member, the adjustment collar having a collar body, the collar body including an inner hollow part that allows insertion of the first reference shaft and an adjustment outer surface or supporting the bearing, wherein
the adjustment outer surface of the collar body of the adjustment collar is inclined relative to a direction of the first reference axis in a cross-sectional view of the adjustment collar that is cut along a plane including the first reference axis of the first reference shaft,
the inclination of the adjustment outer surface in the cross-sectional view of the adjustment collar that is cut along the plane including the first reference axis of the first reference shaft is changeable by rotating the adjustment collar relative to the first reference shaft,
the adjustment collar is a combination of a first adjustment collar piece and a second adjustment collar piece, the first adjustment collar piece and the second adjustment collar piece being identical in shape,
the first adjustment collar piece and the second adjustment collar piece each include: an inner hollow part that allows the insertion of the first reference shaft of the first rotating member, an adjustment outer surface for supporting the bearing for the first rotating member, a flange part on one end of the collar piece in a longitudinal direction, and an engagement part on the other end of the collar piece in the longitudinal direction, and the first adjustment collar piece and the second adjustment collar piece are formed such that if the engagement part of the second adjustment collar piece is engaged with the engagement part of the first adjustment collar piece with the first reference shaft inserted into the first adjustment collar piece, the adjustment outer surface of the first adjustment collar piece and the adjustment outer surface of the second adjustment collar piece are both inclined in the same direction in the cross-sectional view of the adjustment collar that is cut along the plane including the first reference axis of the first reference shaft.

2. The conveyor device according to claim 1, further comprising:

a driving source that generates a rotary driving force, wherein the second rotating member is a driving rotating member that rotates in response to a driving force from the driving source, the first rotating member is a non-driving rotating member that is rotated via the wrapping member according to a rotation of the driving rotating member, and the driving rotating member rotates in response to the driving force from the driving source revolving the wrapping member between the driving rotating member and the non-driving rotating member, the non-driving rotating member including the adjustment collar that is rotated relative to the first reference shaft of the non-driving rotating member so as to change the inclination of the adjustment outer surface in the cross-sectional view of the adjustment collar that is cut along the plane including the first reference axis of the first reference shaft, allowing an adjustment of a position of the wrapping member in a lateral direction on an outer surface of the non-driving rotating member while the wrapping member is revolved between the driving rotating member and the non-driving rotating member, the lateral direction crossing a transporting direction of the conveyor device.

3. The conveyor device according to claim 1, wherein the collar body of the adjustment collar is cylindrical, and an outside diameter axis and an inside diameter axis extend in different directions, the outside diameter axis passing through a center of a circumscribed circle of the adjustment outer surface of the collar body, the inside diameter axis passing through a center of an inscribed circle of the inner hollow part of the collar body.

4. The conveyor device according to claim 1, wherein the adjustment collar has one of an adjustment hole and an adjustment notch on an outer periphery of the adjustment collar, and a rod member is inserted into one of the adjustment hole and the adjustment notch from outside and is operated so as to rotate the adjustment collar relative to the first reference shaft of the first rotating member.

5. The conveyor device according to claim 4, wherein a plurality of sets of the first and second rotating members and the wrapping members are arranged in parallel so as to transport an article placed across the wrapping members parallel to each other, one of the sets of first and second rotating members arranged in parallel is located on one end in a placement direction of the first rotating members and includes one of the adjustment hole and the adjustment notch of the adjustment collar on one end in an axial direction of the adjustment collar, and the one end having one of the adjustment hole and the adjustment notch in the axial direction is directed to the one end in the placement direction of the first rotating members.

6. The conveyor device according to claim 1, wherein the first rotating member approaches or moves away from the second rotating member so as to adjust a tension of the wrapping member wrapped between the first and second rotating members.

* * * * *